United States Patent [19]

Hogan

[11] Patent Number: 4,606,659

[45] Date of Patent: Aug. 19, 1986

[54] BEARING AND STUB SHAFT ASSEMBLY

[75] Inventor: Martin J. Hogan, Sandusky, Ohio

[73] Assignee: General Motors Corporation, Detroit, Mich.

[21] Appl. No.: 718,548

[22] Filed: Apr. 1, 1985

[51] Int. Cl.[4] .................... B65G 39/09; F16C 13/00
[52] U.S. Cl. .................................. 384/518; 193/37; 384/546
[58] Field of Search ............... 193/35 R, 37; 384/490, 384/495, 517, 518, 543, 546, 586

[56] References Cited

U.S. PATENT DOCUMENTS

| 960,009 | 5/1910 | Goldman. | |
|---|---|---|---|
| 1,351,481 | 8/1920 | Lister. | |
| 1,362,910 | 12/1920 | Zoeller et al. | 384/546 |
| 2,141,810 | 12/1938 | Carroll | 384/546 |
| 4,148,386 | 4/1979 | Bradbury | 193/37 |
| 4,311,226 | 1/1982 | Thompson et al. | 193/37 X |

FOREIGN PATENT DOCUMENTS 61893 10/1982 European Pat. Off. .............. 193/37

Primary Examiner—Stuart S. Levy
Assistant Examiner—Daniel P. Stodola
Attorney, Agent, or Firm—Patrick M. Griffin

[57] ABSTRACT

A bearing and stub shaft assembly for a belt conveyor or the like provides a non-rotatable connection between the stub shaft and the inner race of a bearing supporting one end of a cylindrical roller. An inner surface of a central cup in the inner race and the deformed elliptical outer surface of a hollow end of the stub shaft interfit to give a simple, non-rotational connection. At the same time, a cylindrical coil spring captured within the end of the stub shaft as it is deformed is compressed within the central cup to provide a preload to the bearing.

3 Claims, 9 Drawing Figures

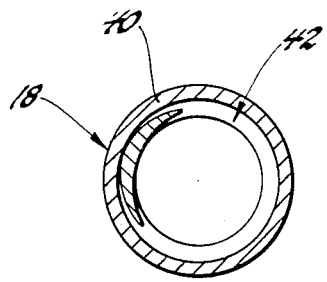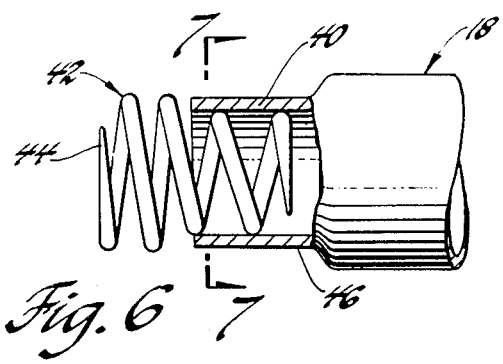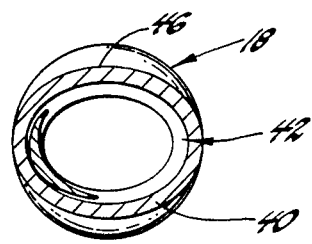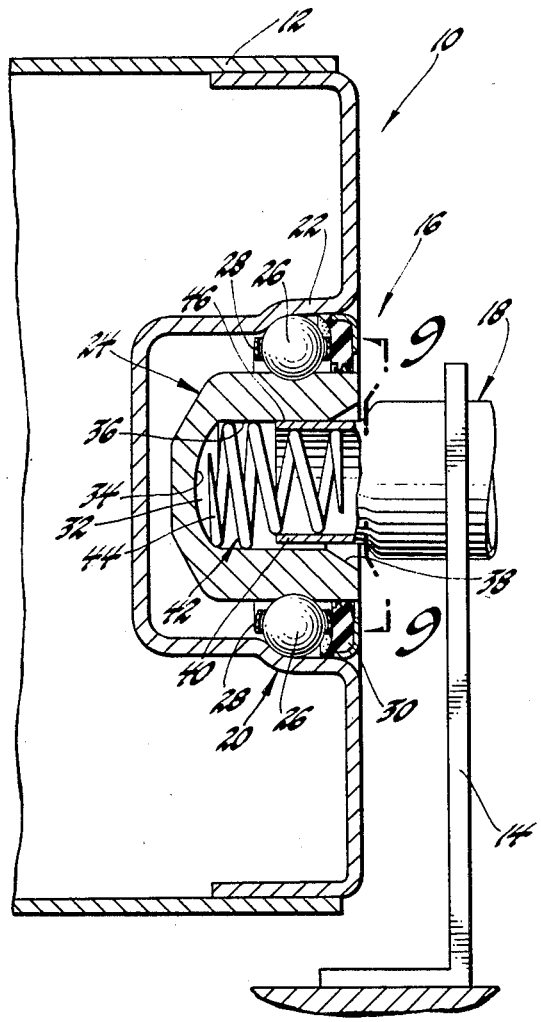

BEARING AND STUB SHAFT ASSEMBLY

This invention relates to bearings in general and specifically to an improved bearing and stub shaft assembly for a belt conveyor or the like.

BACKGROUND OF THE INVENTION

Belt conveyors are in common use in various industrial, mining and agricultural operations. They generally consist of a belt supported all along its length by a series of conveyor idlers. Each conveyor idler consists of a frame on which is mounted one or more freely rotatable cylindrical rollers on which the belt runs. Generally, two or more stub shafts are fixed to the frame. Each end of each cylindrical roller is supported on a stub shaft by a bearing having rolling bearing elements, generally bearing balls. The bearing balls are in turn held between an outer race fixed to the end of the roller and an inner race connected to the stub shaft. It is necessary that the connection between the inner race and stub shaft be non-rotational. Often, this connection is provided by an inner race having a splined bore and a solid stub shaft with grooves cut into the end thereof. The grooves and splines interfit with a small amount of radial and axial play, and give a non-rotatational connection, but require expensive machining.

The belt may be subjected to heavy, varying loads and varying speeds, as will the bearing elements. It would be desirable, therefore, to provide a preload to the bearing to help assure that the load is shared equally among all the bearing elements. A conveyor disclosed in the U.S. Pat. No. 1,362,910 to Zoeller et al shows a bearing assembly with a compression spring loaded against the outer race of a bearing. However, the spring is primarily designed to compensate for wear on the races and to create a braking effect on the roller when the load is removed. This structure is also somewhat complex, requiring an axially slidable outer race and a retaining ring.

SUMMARY OF THE INVENTION

The present invention provides an improved bearing and stub shaft assembly for a belt conveyor that provides both a non-rotational connection between the inner race and the stub shaft and a preload means for the rolling bearing elements.

A belt conveyor includes at least one belt supporting cylindrical roller with at least one end of the roller supported on a stub shaft fixed to a frame. The end of the roller is supported on the stub shaft by a bearing including a complement of bearing balls held between an outer race fixed to the end of the roller and an inner race connected to the stub shaft.

The bearing and stub shaft assembly of the invention provides both a non-rotational connection between the inner race and stub shaft as well as a preload means for the bearing balls. A central cup is formed in the inner race and has a generally elliptical inner surface. The stub shaft has a hollow cylindrical end with a wall thickness thin enough to allow it to be deformed. Deformation of the hollow end of the stub shaft gives it an elliptical outer surface that is generally complementary to the elliptical inner surface of the central cup in the inner race. These complementary elliptical inner and outer surfaces allow the inner race to be connected to the stub shaft by inserting the deformed stub shaft end within the central cup. The complementary surfaces interfit with a clearance sufficiently small that rotation therebetween is prevented. Thus, a non-rotational connection between the inner race and stub shaft is achieved with a simple and easily produced structure.

In addition, a cylindrical coil spring sized to fit closely within the hollow end of the stub shaft is inserted therewithin before deformation with an end of the spring projecting out. When the hollow end of the stub shaft is deformed to create the elliptical outer surface described, the coil spring is gripped within the deformed end of the stub shaft. Therefore, when the end of the stub shaft is inserted within the central cup of the inner race as described, the coil spring is simultaneously compressed within the central cup. The force of the compressed spring on the central cup and inner race serves to preload the bearing balls to evenly distribute the load thereon.

Other benefits may be easily achieved by modifying the structure. The stub shaft may be fixed to the frame so that the major axis of the elliptical outer surface of the deformed end of the stub shaft is substantially horizontal. When the belt carries a load, which is in turn transmitted to the cylindrical roller and to the inner race, substantially the entire respective upper halves of the interfitting surfaces will be engaged, giving the maximum load supporting contact. In addition, the clearance between the interfitting surfaces may be made sufficiently large to allow a certain amount of relative tilting between the axis of the stub shaft and the axis of the central cup of the inner race, while still preventing relative rotation. Thus, the stub shaft and inner race can self-align to an extent to compensate for misalignment in other parts of the conveyor structure.

It is, therefore, an object of the invention to provide an improved bearing and stub shaft assembly for a belt conveyor with a cylindrical roller supported by a rolling element bearing with an inner bearing race connected to the stub shaft by interfitting an elliptical inner surface of a central cup in the inner race with an elliptical outer surface of a deformed hollow end of the stub shaft with sufficiently small clearance to prevent rotation therebetween, while a cylindrical coil spring received in the cylindrical hollow end of the stub shaft before deformation is gripped therewithin by the deformation and compressed within the central cup of the inner race when the deformed stub shaft end is inserted therewithin to also provide a preload to the bearing elements.

It is a further object of the invention to provide an improved bearing and stub shaft assembly of the type described in which the major axis of the elliptical outer surface of the deformed stub shaft end is oriented substantially horizontally to provide a maximum load supporting contact between the interfitting elliptical surfaces of the inner race central cup and deformed stub shaft end when the belt of the conveyor carries a load.

It is yet another object of the invention to provide an improved bearing and stub shaft assembly of the type described in which the clearance between the interfitting elliptical surfaces of the central cup of the inner race and the deformed stub shaft end is also made sufficiently large to allow self-aligning tilting between the axis of the stub shaft end and the central cup of the inner race.

DESCRIPTION OF THE PREFERRED EMBODIMENT

These and other objects are features of the invention will appear from the following written description and drawings in which;

FIG. 5 is a view along the line 5—5 of FIG. 4,

FIG. 6 is a view similar to FIG. 4 after deformation of the end of the stub shaft, FIG. 7 is a view along the line 7—7 of FIG. 6, FIG. 8 is a view of a portion of the cylindrical roller and the bearing and stub shaft assembly of the invention in cross section, FIG. 9 is a view along the line 9—9 of FIG. 8.

Figure 1:
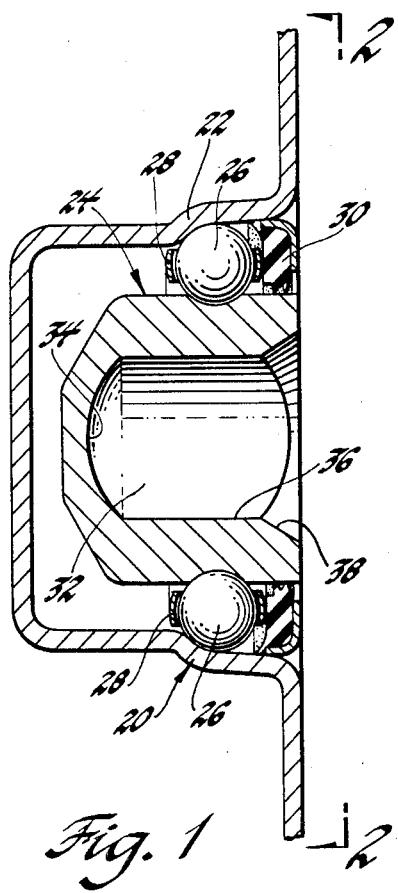
FIG. 1 is a cross-sectional view through the races of the bearing.

Referring first to FIG. 8, a belt conveyor generally includes a series of conveyor idlers 10, which in turn include a cylindrical roller 12 rotatably mounted to a fixed frame, one member of which is designated at 14. Cylindrical roller 12, one end of which is shown, is mounted to frame member 14 by the bearing and stub shaft assembly of the invention, designated generally at 16, and described in further detail below. Cylindrical roller 12 may rest beneath and support a loaded conveyor belt, not shown, or an unloaded belt may run beneath roller 12 on the return portion of the belt's path of travel. The load seen by cylindrical roller 12, when the belt is loaded, and in turn by the bearing and stub shaft assembly 16, may be quite heavy, and may also vary considerably, as may the belt speed.

Still referring to FIG. 8, the end of roller 12 shown is supported on a stub shaft designated generally at 18 by a rolling element bearing designated generally at 20. Stub shaft 18 is fixed to the frame member 14 by any suitable means, not shown. Bearing 20 includes outer race 22, an inner race designated generally at 24 and a complement of rolling bearing elements held therebetween, in this case bearing balls 26. Bearing balls 26 are circumferentially spaced by a conventional separator 28 with a suitable lubricant, not shown, retained by a conventional seal 30. As shown, outer race 22 is an integral stamping welded or otherwise attached within the end of cylindrical roller 12, although other types of bearing races may be used within the scope of the invention.

Figure 2:
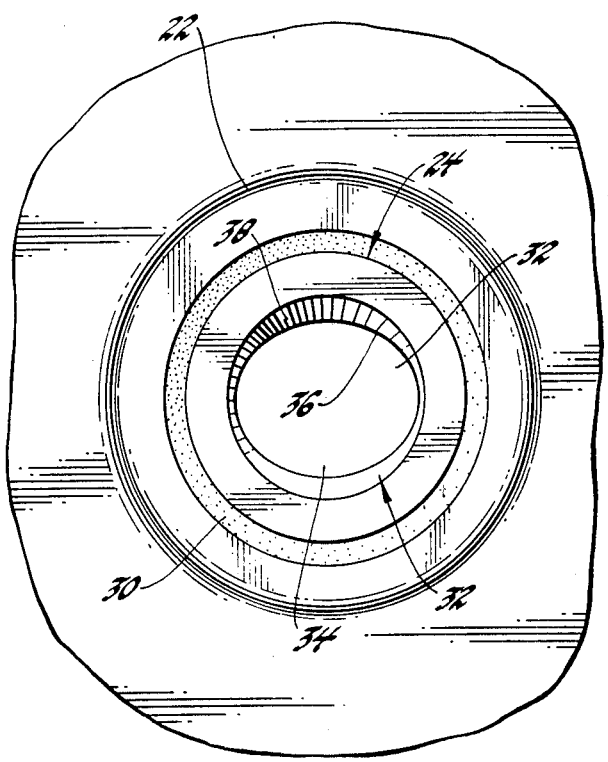
FIG. 2 is a view along line 2—2 of FIG. 1 looking axially into the bearing.

Referring next to FIGS. 1 and 2, inner race 24 includes a central cup formed therein, designated generally at 32, which has a base 34 and a generally elliptical inner surface 36, best seen in FIG. 2. Central cup 32 opens outwardly across a chamfer 38. Since outer race 22 rotates with cylindrical roller 12, it is necessary to establish a non-rotational connection between inner race 24 and stub shaft 18. In addition, because of the type of forces and loading experienced by bearing 20, it is desirable, if possible, to apply a preload to bearing balls 26. These and other objects are achieved by the remaining structure of bearing and stub shaft assembly 16, described below.

Figure 3:
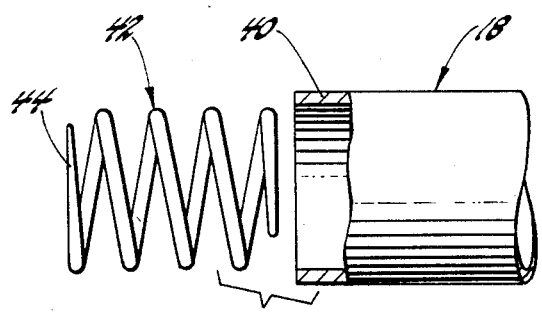
FIG. 3 is a view of the end of the stub shaft with the spring removed.
Figure 4:
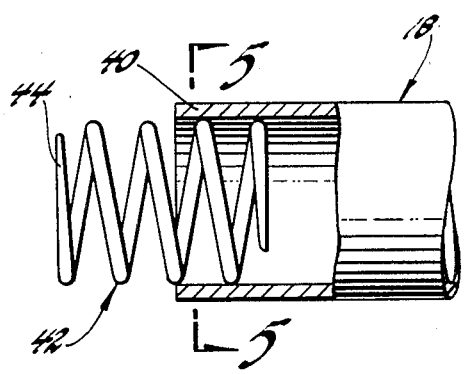
FIG. 4 is a view similar to FIG. 3 with the spring inserted.

Referring next to FIG. 3, stub shaft 18 includes at least one cylindrical hollow end designated generally at 40. As disclosed, stub shaft 18 is entirely hollow, although this would not be strictly necessary. The wall thickness of cylindrical hollow end 40 is thin enough that it may be deformed, as described further below. A cylindrical coil spring, designated generally at 42, is sized to fit within undeformed hollow stub shaft end 40 with an end 44 thereof projecting out, as seen in FIG. 4. This fit is substantially close, as may be best seen in Figure 5.

Referring next to FIG. 6, hollow stub shaft end 40 is deformed by any suitable means to give a generally elliptical outer surface 46, the shape of which may be best seen in FIG. 7. The entire purpose for this deformation will be described below, but it will be understood that that part of coil spring 42 within hollow stub shaft end 40 will be likewise elliptically deformed and gripped by this deformation. Thus, spring end 44 will be rigidly axially held relative to stub shaft 18.

Referring next to FIGS. 8 and 9, the connection of inner race 24 to stub shaft 18 may be seen. Spring end 44 and deformed hollow stub shaft end 40 are moved axially past chamfer 38 and into central cup 32, compressing spring end 44 against cup base 34 a desired amount. Stub shaft 18 is then fixed to frame member 14. The compression of spring end 44 provides a preload to bearing balls 26, thereby distributing any load they experience more evenly. This is advantageous regardless of the load on the belt, because of wear equalization on balls 26. Furthermore, this preload helps to cushion any axial play or run out of roller 12 relative to stub shaft 18 that might result from misalignment of outer race 22.

Referring next to FIG. 9, the elliptical outer surface 46 of deformed hollow stub shaft end 40 is sized and shaped to be substantially complementary to the elliptical inner surface 36 of cup 32 so that the two surfaces interfit with a clearance C. Stated specifically, the ellipse of the outer surface 46 has essentially the same major axis, but is of a smaller degree, than the ellipse of the inner surface 36. In the embodiment disclosed, this clearance C is on the order of 30 to 40 thousands of an inch, and is exaggerated in FIG. 9 for purposes of illustration. The smallness of clearance C and the complementary sizing of the inner and outer surfaces 36 and 46 assures that one will not turn within the other, and inner race 24 will therefore be non-rotatably connected to stub shaft 18.

While the inner race 24—stub shaft 18 connection will be non-rotatable for any orientation of stub shaft 18, fixing stub shaft 18 to frame member 14 so as to orient the major axis of elliptical outer surface 46 substantially horizontally, as shown, gives an additional advantage. In the case where cylindrical roller 12 is supporting a loaded belt, which load is transmitted through roller 12 to inner race 24, elliptical outer surface 46 will interfit within elliptical inner surface 36, under the influence of the load carrying belt, with substantially the entire respective upper halves of both surfaces engaged. This gives the maximum load supporting contact between the two surfaces. The clearance C appears between the respective lower halves of the surfaces 46 and 36, as seen in FIG. 9.

Furthermore, the clearance C may also be made sufficiently large, regardless of the orientation, to allow an angular offset or tilting between the axes of central cup 32 and hollow stub shaft end 40. This self-alignment between stub shaft 18 and inner race 24 can compensate for misalignments in other parts of the structure, such as outer race 22. Clearly, clearance C could be made larger without losing the non-rotational connection between stub shaft 18 and inner race 24. However, as a practical matter, only a very few degrees of self-aligning motion is necessary, and the clearance C should be kept as small as practicable.

Therefore, it will be seen that the structure of the invention gives a benefit of a non-rotatable connection and a preload with simple and easily assembled structure, as well as additional benefits of good load supporting contact and a degree of self-alignment. It will be understood that the invention is capable of being embodied in structures other than those disclosed, and is not intended to be so limited.

The embodiments of the invention in which an exclusive property or privilege is claimed are defined as follows:

1. An improved bearing and stub shaft assembly for a belt conveyor of the type having a cylindrical roller, one end of which is supported on a fixed stub shaft by a bearing having rolling bearing elements held between an outer race fixed to said roller end and an inner race connected to said stub shaft, said improved assembly providing both a non-rotational connection between said inner race and stub shaft and a preload means for said rolling bearing elements, comprising:

a central cup formed in said inner race having a generally elliptical inner surface, a substantially cylindrical hollow end on said stub shaft deformable to give an elliptical outer surface sized sufficiently complementary to the elliptical inner surface of said central cup so that said inner race may be connected to said stub shaft by inserting said stub shaft end after deformation into said central cup, with said outer and inner surfaces of said stub shaft end and central cup respectively interfitting with a clearance sufficiently small to prevent relative rotation therebetween, and a substantially cylindrical coil spring sized to fit substantially closely within said stub shaft end before deformation of said deformable end so that said stub shaft end after deformation also cooperates to elliptically deform and thereby grip said cylindrical coil spring with one end of said spring projecting from said stub shaft end, said one end of said spring being compressed within said central cup when said stub shaft end is inserted into said central cup to thereby provide a preload to said rolling bearing elements.

2. An improved bearing and stub shaft assembly for a load carrying belt conveyor of the type having a cylindrical roller located beneath said belt, one end of which is supported on a fixed stub shaft by a bearing having rolling bearing elements held between an outer race fixed to said roller end and an inner race connected to said stub shaft, said improved assembly providing both a non-rotational load supporting connection between said inner race and stub shaft and a preload means for said rolling bearing elements, comprising:

a central cup formed in said inner race having a generally elliptical inner surface, and a substantially cylindrical hollow end on said stub shaft deformable to give an elliptical outer surface oriented with its major axis substantially horizontal and sized sufficiently complementary to the elliptical inner surface of said central cup so that said inner race may be connected to said stub shaft by inserting said stub shaft end after deformation into said central cup, with said horizontally oriented outer and inner surfaces of said stub shaft end and central cup respectively interfitting under the influence of said load carrying belt with maximum load supporting contact between the respective upper halves of said interfitted surfaces and with a clearance sufficiently small to prevent relative rotation therebetween, and a substantially cylindrical coil spring sized to fit substantially closely within said hollow stub shaft end before deformation of said deformable end so that said stub shaft end after deformation also cooperates to elliptically deform and thereby grip said cylindrical coil spring with one end of said spring projecting from said stub shaft end, said one end of said spring being compressed within said central cup when said stub shaft end is inserted into said central cup to thereby provide a preload to said rolling bearing elements.

3. An improved bearing and stub shaft assembly for a belt conveyor of the type having a cylindrical roller, one end of which is supported on a fixed stub shaft by a bearing having rolling bearing elements held between an outer race fixed to said roller end and an inner race connected to said stub shaft, said improved assembly providing both a non-rotational connection between said inner race and stub shaft and a preload means for said rolling bearing elements, comprising:

a central cup formed in said inner race having a generally elliptical inner surface, and a substantially cylindrical hollow end on said stub shaft deformable to give an elliptical outer surface sized sufficiently complementary to the elliptical inner surface of said central cup so that said inner race may be connected to said stub shaft by inserting said stub shaft end after deformation into said central cup, with said outer and inner surfaces of said stub shaft end and central cup respectively interfitting with a clearance sufficiently small to prevent relative rotation therebetween, said clearance further being sufficiently large to allow self-aligning tilting between the axis of said stub shaft end and central cup, and a substantially cylindrical coil spring sized to fit substantially closely within said hollow stub shaft end before deformation of said deformable end so that said stub shaft end after deformation also cooperates to elliptically deform and thereby grip said cylindrical coil spring with one end of said spring projecting from said stub shaft end, said one end of said spring being compressed within said central cup when said stub shaft end is inserted into said central cup to thereby provide a preload to said rolling bearing elements.

* * * * *